2,763,668
HYDROXY SUBSITUTED POLYFLUORINATED ANTHRAQUINONE COMPOUNDS

Joseph B. Dickey and Edmund B. Towne, Kingsport, Tenn., assignors to Eastman Kodak Company, Rochester, N. Y., a corporation of New Jersey No Drawing. Original application February 15, 1951, Serial No. 211,177, now Patent No. 2,700,686, dated January 25, 1955. Divided and this application July 1, 1952, Serial No. 296,748

2 Claims. (Cl. 260—379)

This invention relates to new anthraquinone compounds useful for the dyeing of cellulose ester, especially cellulose acetate, textile materials.

The new anthraquinone compounds of the invention are represented for the most part by the anthraquinone compounds set forth hereinafter and which have the formulas designated I, II and III, respectively.

The present invention includes anthraquinone compounds having the formula:

I
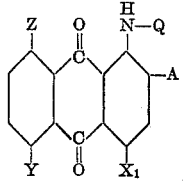

wherein Q represents a 3,3,3-trifluoro-2-hydroxypropyl group, a 3,3-difluoro-2-hydroxyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group or a 4,4-difluoro-2-hydroxybutyl group, $X_1$ represents a hydrogen atom, a hydroxy group, a bromine atom, a β-hydroxyethylamino group, a β-hydroxypropylamino group, a γ-hydroxypropylamino group, a β,γ-dihydroxyproplyamino group, a δ-hydroxybutylamino group, a monoalkylamino group having one to four, inclusive, carbon atoms, a monoalkoxyalkylamino group having three to four, inclusive, carbon atoms, a 2,2-difluoroethylamino group, a 2,2-difluoro-n-propylamino group, a 3,3-difluoropropylamino group, a 2,2,2-trifluoroethylamino group, a 3,3,3-trifluoropropylamino group, a 3,3,3-trifluoro-2-hydroxypropylamino group, a 3,3-difluoro-2-hydroxypropylamino group, a 3,3,3-trifluoro-2-methyl-2-hydroxypropylamino group, a 3,3-difluoro-2-methyl-2-hydroxypropylamino group, a 4,4,4-trifluoro-2-hydroxybutylamino group, a 4,4-difluoro-2-hydroxybutylamino group, a phenylamino group or a

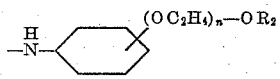

group, wherein $R_2$ represents a hydrogen atom, a methyl group or an ethyl group and $n$ represents a small whole integer of from two to three, inclusive, A represents a hydrogen atom or a bromine atom and Y and Z each represent a hydrogen atom or a hydroxy group. These compounds are readily prepared (as described hereinafter) by reacting the appropriate anthraquinone compound with an amine selected from the group consisting of 3,3,3-trifluoro-2-hydroxypropylamine, 4,4,4-trifluoro-2-hydroxybutylamine, 4,4-difluoro-2-hydroxybutylamine, 3,3-difluoro-2-hydroxybutylamine, 3,3,3-trifluoro-2-methyl-2-hydroxypropylamine and 3,3-difluoro-2-methyl-2-hydroxypropylamine. The anthraquinone compounds just referred to are dyes for cellulose acetate textile materials.

The present invention likewise includes the anthraquinone compounds having the formula:

II
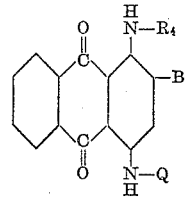

wherein Q represents a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group or a 4,4-difluoro-2-hydroxybutyl group, B represents a cyano group, a carboxy group or a —COOR$_3$ group wherein R$_3$ represents an alkyl group having one to four, inclusive, carbon atoms and R$_4$ represents a hydrogen atom, an alkyl group having one to four, inclusive, carbon atoms, a β-hydroxyethyl group, a β-hydroxypropyl group, a γ-hydroxypropyl group, a β,γ-dihydroxyl group or a δ-hydroxybutyl group are made possible. These compounds, as the compounds of formula I, are dyes for cellulose ester, particularly cellulose acetate, textile materials. Their preparation is described hereinafter.

Further, the present invention includes the anthraquinone compounds having the formula:

III
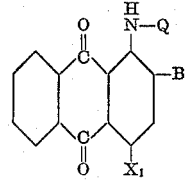

wherein Q represents a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group or a 4,4-difluoro-2-hydroxybutyl group, B represents a cyano group, a carboxy group or a —COOR$_3$ group wherein R$_3$ represents an alkyl group having one to four carbon atoms and $X_1$ represents a hydrogen atom, a hydroxy group, a bromine atom, a β-hydroxyethylamino group, a β-hydroxypropylamino group, a γ-hydroxypropylamino group, a β,γ-dihydroxypropyl amino group, a δ-hydroxybutylamino group, a monoalkylamino group having one to four, inclusive, carbon atoms, a monoalkyloxyalkylamino group having three to four, inclusive, carbon atoms, a 2,2-difluoroethylamino group, a 2,2-difluoro-n-propylamine group, a 3,3-difluoropropylamino group, a 2,2,2,-trifluoroethylamino group, a 3,3,3-trifluoropropylamino group, a 3,3,3-trifluoro-2-hydroxypropylamino group, a 3,3-difluoro-2-hydroxypropylamino group, a 3,3,3-trifluoro-2-methyl-2-hydroxypropylamino group, a 3,3-difluoro-2-methyl - 2 - hydroxypropylamino group, a 4,4,4-trifluoro - 2 - hydroxybutylamino group, a 4,4-difluoro-2-hydroxybutylamino group, a phenylamino group or a

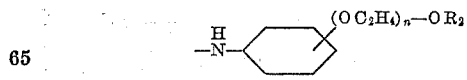

group, wherein $R_2$ represents a hydrogen atom, a methyl group or an ethyl group and $n$ represents a small whole integer of from two to three, inclusive. These compounds also are dyes for cellulose ester, especially cellulose acetate, textile materials.

The following examples illustrate the invention.

*Example 1.*—25 grams of sodium-α-anthraquinone sulfonic acid, a 20 ccs. of water and 100 grams of 3,3,3-trifluoro-2-hydroxypropylamine are reacted together at 150° C.–180° C. for 10 hours in an autoclave. When cool, the autoclave is opened and the contents are filtered to recover the reaction product which is washed well with water and dried. 1-β-hydroxy-γ-trifluoropropylaminoanthraquinone is thus obtained. It colors cellulose acetate textile materials reddish-orange shades.

By use of an equivalent amount of 3,3-difluoro-2-hydroxypropylamine in place of 3,3,3-trifluoro-2-hydroxypropylamine in the foregoing reaction, 1-β-hydroxy-γ-difluoropropylaminoanthraquinone is obtained. It colors cellulose acetate textile materials reddish-orange shades.

*Example 2.*—25 grams of sodium-1,5-anthraquinonedisulfonate, 100 grams of 3,3-difluoro-2-hydroxypropylamine and 200 ccs. of water are placed in an autoclave and heated at 150° C.–180° C. for 10 hours. When cool, the contents of the autoclave are filtered to recover the reaction product on the filter which is washed well with water and dried. 1,5-bis-β-hydroxy-γ-difluoropropylaminoanthraquinone is thus obtained. It colors cellulose acetate textile materials red shades.

*Example 3.*—25 grams of sodium-1,5-anthraquinonedisulfonate, 120 grams of 3,3,3-trifluoro-2-hydroxypropylamine and 200 ccs. of water are placed in an autoclave and heated together at 150° C.–180° C. for 10 hours. Upon cooling, the contents of the autoclave are filtered to obtain the reaction product upon the filter. The reaction product is washed well and dried. 1,5-bis-β-hydroxy-γ-trifluoropropylaminoanthraquinone which colors cellulose acetate textile materials red shades is obtained.

*Example 4.*—24 grams of leucoquinizarin are dissolved in 500 ccs. of n-butyl alcohol and the reaction mixture thus obtained is heated to boiling. Then 13 grams of 3,3,3-trifluoro-2-hydroxy-propylamine in 50 ccs. of n-butyl alcohol are added dropwise, with stirring, over a period of 1 hour. Refluxing is continued until no further change takes place. The leuco form of the reaction product thus prepared is oxidized to its nonleuco form with sodium perborate and the dye product is precipitated from the reaction mixture by adding water. The reaction product is recovered by filtration, washed with water and dried. 1-β-hydroxy-γ-trifluoropropylamino-4-hydroxyanthraquinone which colors cellulose acetate textile materials violet shades is thus obtained.

By the use of an equivalent amount of 3,3-difluoro-2-hydroxypropylamine in place of 3,3,3-trifluoro-2-hydroxypropylamine in the above example, 1-β-hydroxy-γ-difluoropropylamino-4-hydroxyanthraquinone is obtained. It colors cellulose acetate textile materials reddish-violet shades.

*Example 5.*—24 grams of leucoquinizarin and 25 grams of 3,3-difluoro-2-hydroxypropylamine are reacted together and worked up in accordance with the procedure described in Example 4. 1,4-bis-β-hydroxy-γ-difluoropropylaminoanthraquinone which colors cellulose acetate textile materials reddish-blue shades is obtained.

By use of an equivalent amount of 3,3,3-trifluoro-2-hydroxypropylamine in place of 3,3-difluoro-2-hydroxypropylamine in the above example, 1,4-bis-β-hydroxy-γ-trifluoropropylaminoanthraquinone is obtained. It colors cellulose acetate textile materials blue shades.

*Example 6.*—33.5 grams of 1-β-hydroxy-γ-trifluoropropylaminoanthraquinone are dissolved in 27.5 ccs. of pure and dry pyridine at about 95° C. Then 17 grams of bromine are added dropwise. Upon completion of the bromination reaction which takes place, the reaction mixture is cooled, while stirring, and the desired product crystallizes out. 1-β-hydroxy-γ-trifluoropropylamino-4-bromoanthraquinone is thus obtained.

By the use of an equivalent amount of 1-β-hydroxy-β-methyl-γ-trifluoropropylaminoanthraquinone in place of 1-β-hydroxy-γ-trifluoropropylaminoanthraquinone in the above reaction, 1-β-hydroxy-β-methyl-γ-trifluoropropylamino-4-bromoanthraquinone is obtained.

*Example 7.*—33 grams of 1-β-hydroxy-β-methyl-γ-difluoropropylaminoanthraquinone are reacted with 17 grams of bromine in accordance with the procedure described in Example 6. 1-β-hydroxy-β-methyl-γ-difluoropropylamino-4-bromoanthraquinone is thus obtained.

*Example 8.*—31.7 grams of 1-β-hydroxy-β-methyl-γ-difluoropropylaminoanthraquinone are dissolved in 300 ccs. of acetic acid and 17 grams of anhydrous sodium acetate are added. Then 66 grams of bromine are added dropwise, with stirring, to the reaction mixture and after all the bromine has been added the reaction mixture is warmed to complete the bromination reaction. The reaction product which forms is recovered by filtration and then purified by crystallization from a solvent such as chlorobenzene, acetic acid or N-butyl alcohol. The red product is 1-β-hydroxy-β-methyl-γ-difluoropropylamino-2,4-dibromoanthraquinone.

By the use of an equivalent weight of 1-β-hydroxy-γ-difluoropropylaminoanthraquinone in place of 1-β-hydroxy-β-methyl-γ-difluoropropylaminoanthraquinone in the example, 1-β-hydroxy-γ-difluoropropylamino-2,4-dibromoanthraquinone is obtained.

*Example 9.*—10 grams of 1-β-hydroxy-β-methyl-γ-trifluoropropylamino-4-bromoanthraquinone are heated in 100 ccs. of n-butyl alcohol with 10 grams of β-hydroxyethylamine using cuprous acetate as a catalyst and potassium acetate to react with the hydrogen bromide liberated during the reaction. Upon working up the reaction mixture in the usual manner, 1-β-hydroxy-β-methyl-γ-trifluoropropylamino-4-β-hydroxyethylaminoanthraquinone is obtained. It colors cellulose acetate textile materials blue shades.

*Example 10.*—50 grams of 1-β-hydroxy-γ-trifluoropropylamino-4-bromoanthraquinone, 57 grams of p-aminophenyl-β-hydroxy-β-ethoxy-β-ethoxyethyl ether, 17 grams of potassium acetate and 2 grams of copper acetate are heated in 100 ccs. of n-butyl alcohol on a steam bath for 5 to 6 hours. After cooling, the reaction mixture is poured into 3 liters of cold water. After stirring the reaction mixture thus obtained for several hours, the somewhat oily dye that separates solidifies. The 1-β-hydroxy-γ-trifluoropropylamino-4-p-(β-hydroxy-β-ethoxy-β-ethoxyethoxy) phenylaminoanthraquinone formed is recovered by filtration, washed well with water and dried. It is purified by crystallization from toluene. It colors cellulose acetate textile materials greenish-blue shades.

*Example 11.*—0.1 gram mole of 1-phenylamino-4-bromoanthraquinone is reacted with 0.11 gram mole of 3,3,3-trifluoro-2-hydroxypropylamine in accordance with the procedure described in Example 10. 1-phenylamino-4-β-hydroxy-γ-trifluoropropylaminoanthraquinone is obtained. It colors cellulose acetate textile materials greenish-blue shades.

*Example 12.*—10 grams of 1-β-hydroxy-γ-trifluoropropylamino-2,4-dibromoanthraquinone are reacted in boiling n-butyl alcohol with 10 grams of 3,3,3-trifluoro-2-hydroxypropylamine, 0.1 gram of copper acetate and 5 grams of sodium acetate. When no further color change takes place toward the blue, the reaction mixture is worked up in the usual manner. 1,4-di-β-hydroxy-γ-trifluoropropylamino-2-bromoanthraquinone is obtained. It colors cellulose acetate textile materials bluish-violet shades.

*Example 13.*—10 grams of 1-β-hydroxyethylamino-2,4-dibromoanthraquinone are reacted in n-butyl alcohol with 10 grams of 3,3,3-trifluoro-2-hydroxypropylamine, 4 grams of potassium acetate and .05 gram of copper acetate. When no further color change takes place toward the blue, the reaction mixture is worked up in the usual manner to recover the reaction product. 1-β-hydroxyethylamino-2-bromo-4-β-hydroxy-γ-trifluoropropylaminoanthraquinone is obtained. It colors cellulose acetate textile materials reddish-blue shades.

Example 14.—27 grams of leuco 1,4,5,8-tetrahydroxyanthraquinone are reacted in 250 ccs. of n-butyl alcohol with 22 grams of 3,3,3-trifluoro-2-hydroxypropylamine until the reaction is complete. The leuco 1,4-di-β-hydroxy-γ-trifluoropropylamino - 5,8 - dihydroxyanthraquinone formed is oxidized with sodium perborate or with air to its nonleuco form. 1,4-di-β-hydroxy-γ-trifluoropropylamino-5,8-dihydroxyanthraquinone is precipitated by the addition of water, recovered by filtration, washed with water and dried. It colors cellulose acetate textile materials greenish-blue shades.

Example 15.—27 grams of leuco-1,4,5,8-tetrahydroxyanthraquinone are placed in 250 ccs. of n-butyl alcohol and 15 grams of 3,3,3-trifluoro-2-methyl-2-hydroxypropylamine are added dropwise, with stirring, over a period of 1 hour while heating to reflux. Refluxing is continued for one more hour and then 10 grams of β-hydroxyethylamine are added and the reaction mixture is refluxed, with stirring, for several hours. Upon working up the reaction mixture, 1-β-hydroxy-β-methyl-γ-trifluoropropylamino-4-β-hydroxyethylamino - 5,8 - dihydroxyanthraquinone is obtained. It colors cellulose acetate textile materials greenish-blue shades.

Following the procedures more particularly described in Examples 1 to 15, inclusive, the following anthraquinone compounds are readily prepared:

1-β-hydroxy-δ-trifluorobutylaminoanthraquinone, 1,4-di-β-hydroxy-γ-difluoropropylamino-5,8-dihydroxyanthraquinone, 1,4-di-β-hydroxy-δ-difluorobutylaminoanthraquinone, 1,4-di-β-hydroxy-β-methyl-γ-trifluoropropylaminoanthraquinone, 1,4-di-β-hydroxy-δ-trifluorobutylaminoanthraquinone, 1-β-hydroxy-γ-trifluoropropylamino-4-methylaminoanthraquinone, 1-β-hydroxy-γ-difluoropropylamino-4-n-butylaminoanthraquinone, 1-β-hydroxy-γ-trifluoropropylamino-4-δ-hydroxybutylaminoanthraquinone, 1-β-hydroxy-γ-trifluoropropylamino-4-β,β-difluoroethylaminoanthraquinone, 1-β-hydroxy - γ - difluoropropylamino-4-β,β,β-trifluoroethylaminoanthraquinone, 1-β-hydroxy-γ-difluoropropylamino-4-p-(β-ethoxy-β-ethoxy-β-ethoxyethoxy) phenylaminoanthraquinone, 1-β-hydroxy-γ-trifluoropropylamino-4-o-(β-methoxy-β-ethoxyethoxy) phenylaminoanthraquinone, 1-β-hydroxy-γ-trifluoropropylamino-4-β-ethoxyethylaminoanthraquinone and 1-β-hydroxy-γ-difluoropropylamino-2-bromo-4-methylaminoanthraquinone.

Example 16.—10 grams of 1-β-hydroxy-γ-trifluoropropylamino-2-bromo-4-hydroxyanthraquinone are dissolved in 100 ccs. of quinoline and 6 grams of cuprous cyanide are added. The reaction mixture resulting is heated, with stirring, to about 175° C. and maintained at this temperature until no further color change takes place. Then the reaction mixture is cooled and steam distilled to remove the quinoline. 1-β-hydroxy - γ - trifluoropropylamino-2-cyano-4-hydroxyanthraquinone operates as a solvent and is recovered by filtration and then recrystallized from ethyl alcohol. It colors cellulose acetate textile materials pinkish-red shades.

By the use of an equivalent weight of 1-β-hydroxy-β-methyl-γ-difluoropropylamino-2-bromo-4-hydroxyanthraquinone in place of 1-β-hydroxy-γ-trifluoropropylamino-2-bromo-4-hydroxyanthraquinone in the foregoing example, 1-β-hydroxy-β-methyl-γ-difluoropropylamino-2-cyano-4-hydroxyanthraquinone is obtained.

Example 17.—10 grams of 1-β-hydroxy-γ-difluoropropylamino-2-bromo-4-methylaminoanthraquinone are dissolved in 75 ccs. of quinoline and 6 grams of cuprous cyanide are added. The reaction mixture thus obtained is heated, with stirring, to about 175° C. until no further color change takes place. Then the reaction mixture is cooled and steam distilled to remove the quinoline. 1-β-hydroxy-γ-difluoropropylamino-2-cyano-4 - methylaminoanthraquinone precipitates out and is recovered by filtration and then recrystallized from ethyl alcohol. It colors cellulose acetate textile materials blue shades.

Example 18.—10 grams of 1-β-hydroxy-β-methyl-γ-trifluoropropylamino-2-bromo-4 - cyclohexylaminoanthraquinone are dissolved in 100 ccs. of pyridine and 6 grams of cuprous cyanide are added. The reaction mixture thus obtained is heated to boiling and when no further color change takes place the reaction mixture is cooled and steam distilled to remove the pyridine. 1-β-hydroxy-β-methyl-γ-trifluoropropylamino-2-cyano-4 - cyclohexylaminoanthraquinone separates as a solid and is recovered by filtration. It is purified by recrystallization from ethyl alcohol. It colors cellulose acetate textile materials blue shades.

Example 19.—10 grams of 1-β-hydroxy-β-methyl-γ-trifluoropropylamino - 2-bromo-4-phenylaminoanthraquinone are dissolved in 75 ccs. of quinoline and 6 grams of cuprous cyanide are added. The reaction mixture is heated, with stirring, to about 175° C. and, when no further color change takes place, is cooled and steam distilled to remove the quinoline. 1-β-hydroxy-β-methyl-γ - trifluoropropylamino - 2 - cyano-4-phenylaminoanthraquinone separates as a solid and is recovered by filtration, after which it is purified by recrystallization from ethyl alcohol. It colors cellulose acetate textile materials greenish-blue shades.

Example 20.—10 grams of 1-β-hydroxy-γ-trifluoropropylamino-2-bromoanthraquinone are dissolved in 100 ccs. of quinoline and 6 grams of cuprous cyanide are added. The reaction mixture is heated and worked up as described in Example 16. 1-β-hydroxy-γ-trifluoropropylamino-2-cyanoanthraquinone is obtained. It colors cellulose acetate textile materials orange-red shades.

By brominating the reaction product which is obtained in pyridine in the presence of sodium acetate, 1-β-hydroxy - γ - trifluoropropylamino-2-cyano-4-bromoanthraquinone is obtained.

Example 21.—10 grams of 1-β-hydroxy-γ-trifluoropropylamino-2-cyano-4-bromoanthraquinone are placed in 50 ccs. of β-methoxyethylamine together with 0.05 gram of copper acetate and 4 grams of potassium acetate. The reaction mixture is warmed gently and heating is continued until no further color change takes place. Then the reaction mixture is drowned in water and filtered to recover 1-β-hydroxy-γ-trifluoropropylamino-2-cyano-4-β-methoxyethylaminoanthraquinone on the filter. The reaction product is purified by crystallization from ethyl alcohol.

Example 22.—10 grams of 1,4-di-β-hydroxy-β-methyl-γ-trifluoropropylamino-2-bromoanthraquinone are reacted with 6 grams of cuprous cyanide in 100 ccs. of quinoline in accordance with the procedure described in Example 16. Upon working up the reaction mixture in accordance with the procedure described in Example 16, 1,4-di - β - hydroxy-β-methyl-γ-trifluoropropylamino-2-cyanoanthraquinone is obtained. It colors cellulose acetate textile materials reddish-blue shades.

Example 23.—10 grams of 1-nitro-2-carboxyanthraquinone, 200 ccs. of water and 15 grams of 3,3,3-trifluoro-2-methyl-2-hydroxypropylaniline are heated together on a steam bath for 6 to 10 hours. The reaction mixture is then cooled and the reaction product which precipitates is recovered by filtration and purified by crystallization from n-butyl alcohol. 1-β-methyl-β-hydroxy-γ-trifluoropropylamino-2-carboxyanthraquinone is thus obtained. It colors cellulose acetate textile materials orange-red shades.

Example 24.—5 grams of 1-β-methyl-β-hydroxy-γ-trifluoropropylamino-2-carboxyanthraquinone are placed in 25 ccs. of acetic acid containing 2 grams of potassium acetate and 1 cc. of bromine in 25 ccs. of acetic acid is added. The reaction mixture is stirred for 4 hours and then heated on a steam bath for 30 minutes. Upon cooling, 1-β-hydroxy-β-methyl-γ-trifluoropropylamino-2-carboxy-4-bromoanthraquinone separates and is recovered by filtration, washed with water and dried.

*Example 25.*—10 grams of 1-β-hydroxy-β-methyl-γ-trifluoropropylamino - 2 - carboxy-4-bromoanthraquinone and 100 ccs. of a 20% aqueous solution of β-hydroxyethylamine are boiled together with vigorous stirring. When no further color change toward the blue takes place, the reaction mixture is cooled and sodium chloride is added thereto to precipitate the reaction product. 1-β - hydroxy - β-methyl-γ-trifluoropropylamino-2-carboxy-4-β-hydroxyethylaminoanthraquinone is obtained on the filter upon filtration of the reaction mixture. It colors cellulose acetate textile materials blue shades.

*Example 26.*—10 grams of 1-β-hydroxy-γ-trifluoropropylamino-2-carboxy-4-bromoanthraquinone are reacted with 100 ccs. of a 20% aqueous methylamine solution in accordance with the procedure described in Example 25. 1 - β-hydroxy-γ-trifluoropropylamino-2-carboxy-4-methylaminoanthraquinone is obtained. It colors cellulose acetate textile materials blue shades.

*Example 27.*—10 grams of 1-β-hydroxy-β-methyl-γ-trifluoropropylamino - 2 - carboxy-4-bromoanthraquinone are reacted with 50 ccs. of benzylamine in accordance with the procedure described in Example 21. 1-β-hydroxy - β - methyl - γ - trifluoropropylamino-2-carboxy-4-benzylaminoanthraquinone is obtained. It colors cellulose acetate textile materials blue shades.

By the use of an equivalent amount of ammonia in place of benzylamine in the foregoing reaction and conducting the reaction in an autoclave, 1-β-hydroxy-β-methyl - γ-trifluoropropylamino-2-carboxy-4-aminoanthraquinone which colors cellulose acetate textile materials blue shades is obtained.

*Example 28.*—10 grams of 1-amino-2-carboxy-4-bromoanthraquinone are reacted in water with 10 grams of 3,3-difluoro-2-hydroxypropylamine. Upon working up the reaction mixture in the usual manner, 1-amino-2-carboxy - 4 - β-hydroxy-γ-difluoropropylaminoanthraquinone which colors cellulose acetate textile materials violet shades is obtained.

By the use of an equivalent amount of 3,3,3-trifluoro-2-hydroxypropylamine in place of 3,3-difluoro-2-hydroxypropylamine in the above example, 1-amino-2-carboxy-4-β-hydroxy-γ-trifluoropropylaminoanthraquinone which colors cellulose acetate textile materials violet shades is obtained.

*Example 29.*—10 grams of 1-ethylamino-2-carboxy-4-bromoanthraquinone, 25 ccs. of a 50% aqueous solution of 3,3-difluoro-2-hydroxypropylamine, 4 grams of sodium acetate and 0.1 gram of copper acetate are heated together, with stirring, on a steam bath. Color develops at once and when no further color change toward the blue takes place the reaction product is precipitated by adding water, recovered by filtration, and then purified by crystallization from ethyl alcohol. 1-ethylamino - 2-carboxy-4-β-hydroxy-γ-trifluoropropylaminoanthraquinone is obtained. It colors cellulose acetate textile materials blue shades.

By the use of an equivalent amount of 4,4,4-trifluoro-2-hydroxybutylamine and 4,4-difluoro-2-hydroxybutylamine, respectively, in place of 3,3-difluoro-2-hydroxypropylamine in the foregoing example, 1-ethylamino-2-carboxy - 4 - β - hydroxy-δ-trifluorobutylaminoanthraquinone and 1-ethylamino-2-carboxy-4-β-hydroxy-δ-difluorobutylaminoanthraquinone, respectively, are obtained.

*Example 30.*—10 grams of 1-β-hydroxy-β-methyl-γ-trifluoropropylamino - 2 - carboxy - 4 - bromoanthraquinone, 10 grams of aniline, 0.1 gram of copper acetate and 4 grams of sodium acetate are heated together, with stirring, on a steam bath for 2 to 3 hours. The reaction mixture is then heated to 180° C. and heating is continued at this temperature until no further color change toward the blue takes place. Upon working up the reaction mixture, 1-β-hydroxy-β-methyl-γ-trifluoropropylamino - 2 - carboxy - 4 - phenylaminoanthraquinone which colors cellulose acetate textile materials blue shades is obtained.

By the use of an equivalent amount of p-toluidine in place of aniline in the foregoing reaction, 1-β-hydroxy-β - methyl - γ - trifluoropropylamino - 2 - carboxy - 4 - p-methylphenylaminoanthraquinone which colors cellulose acetate textile materials blue shades is obtained.

*Example 31.*—60 grams of 1-β-hydroxy-γ-trifluoropropylamino-2-carboxy-4-bromoanthraquinone, 57 grams of p-aminophenyl-β-hydroxy-β-ethoxy-β-ethoxyethyl ether, 17 grams of potassium acetate, 2 grams of copper acetate and 100 ccs. of n-butyl alcohol are heated together on a steam bath for 5–6 hours. After cooling, the reaction mixture is poured into 3 liters of cold water and stirred for several hours. 1-β-hydroxy-γ-trifluoropropylamino - 2 - carboxy - 4 - p - (β - hydroxy - β - ethoxy - β-ethoxyethoxy) phenylaminoanthraquinone separates out and is recovered by filtration, washed with water and dried. It is purified by crystallization from toluene and colors cellulose acetate textile materials greenish-blue shades.

By the use of 60 grams of p-aminophenyl-β-ethoxy-β-ethoxyethyl ether and 51 grams of o-aminophenyl-β-hydroxy-β-ethoxyethyl ether, respectively, in place of the p-aminophenyl-β-hydroxy-β-ethoxy-β-ethoxy-β-ethyl ether in the foregoing example, 1-β-hydroxy-γ-trifluoropropylamino - 2 - carboxy - 4 - p - (β - ethoxy - β-ethoxy-β-ethoxyethoxy) phenylaminoanthraquinone and 1 - β - hydroxy - γ - trifluoropropylamino - 2 - carboxy-4-o-(β-hydroxy-β-ethoxyethoxy) phenylaminoanthraquinone, respectively, are obtained. These compounds likewise color cellulose acetate textile materials greenish-blue shades.

*Example 32.*—61 grams of 1-β-hydroxy-β-methyl-γ-trifluoropropylamino - 2 - carboxy - 4 - bromoanthraquinone, 57 grams of p-aminophenyl-β-hydroxy-β-ethoxy-β-ethoxyethyl ether, 17 grams of potassium acetate and 2 grams of copper acetate are heated together in 100 ccs. of n-butyl alcohol in accordance with the procedure described in Example 31. 1-β-hydroxy-β-methyl-γ-trifluoropropylamino - 2 - carboxy - 4 - p - (β - hydroxy - β-ethoxy - β - ethoxyethoxy) phenylaminoanthraquinone which colors cellulose acetate textile materials greenish-blue shades is obtained.

By the use of 57 grams of 1-β-hydroxy-γ-difluoropropylamino-2-carboxy-4-bromoanthraquinone in place of 1 - β - hydroxy - β - methyl - γ - trifluoropropylamino-2-carboxy-4-bromoanthraquinone in the foregoing example, 1-β-hydroxy-γ-difluoropropylamino-2-carboxy-4-p-(β - hydroxy - β - ethoxy - β - ethoxyethoxy) phenylaminoanthraquinone which colors cellulose acetate textile materials blue shades is obtained.

*Example 33.*—10 grams of 1-nitro-2-carbo-n-butoxyanthraquinone, 200 ccs. of water and 10 grams of 3,3,3-trifluoro-2-hydroxypropylamine are heated together, with stirring, on a steam bath for 6 to 12 hours. Upon completion of the reaction, the reaction mixture is cooled and the 1-β-hydroxy-γ-trifluoropropylamino-2-carbo-n-butoxyanthraquinone which forms and which has the formula:

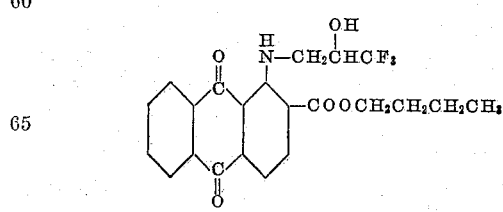

is recovered by filtration and purified by crystallization from n-butyl alcohol. It colors cellulose acetate textile materials orange shades.

By the use of 9 grams of 1-nitro-2-carbomethoxyanthraquinone in place of 1-nitro-2-carbo-n-butoxyanthraquinone in the foregoing example, 1-β-hydroxy-γ-trifluoropropylamino - 2 - carbomethoxyanthraquinone which colors cellulose acetate textile materials orange shades is obtained.

*Example 34.*—10 grams of 1-nitro-2-carboxyanthraquinone are placed in 150 ccs. of n-butyl alcohol containing 1 cc. of sulfuric acid and the reaction mixture resulting is refluxed for 17 hours and filtered while hot. The filtrate is cooled to 25° C. and filtered to recover 1-nitro-2-carbo-n-butoxyanthraquinone on the filter.

By the use of 150 ccs. of methyl alcohol, ethyl alcohol and n-propyl alcohol, respectively, in place of n-butyl alcohol in the foregoing example, 1-nitro-2-carbomethoxyanthraquinone, 1-nitro-2-carboethoxyanthraquinone and 1-nitro-2-carboxy-n-propoxyanthraquinone, respectively, are obtained.

*Example 35.*—5 grams of 1-$\beta$-hydroxy-$\beta$-methyl-$\gamma$-trifluoropropylamino-2-carbomethoxyanthraquinone are placed in 25 ccs. of acetic acid containing 2 grams of potassium acetate and 1 cc. of bromine in 25 ccs. of acetic acid is slowly added thereto. The reaction mixture resulting is stirred for 4 hours and then heated on a steam bath for 30 minutes. Then the reaction mixture is cooled and the 1-$\beta$-hydroxy-$\beta$-methyl-$\gamma$-trifluoropropylamino - 2 - carbomethoxy - 4 - bromoanthraquinone which has formed is recovered by filtration of the reaction mixture, washed with water and dried.

*Example 36.*—10 grams of 1-amino-2-carboxyanthraquinone are placed in 700 ccs. of methyl alcohol containing 2 ccs. of sulfuric acid and the reaction mixture is heated in an autoclave at 120° C. for 16 hours. The reaction mixture is then cooled and filtered. The filtrate is concentrated to 200 ccs. and filtered to recover 1 - amino - 2 - carbomethoxyanthraquinone on the filter. This compound is purified by crystallization from glacial acetic acid and then brominated in acetic acid to obtain 1 - amino - 2 - carbomethoxy - 4 - bromoanthraquinone. The bromination reaction is carried out in accordance with the various bromination procedures described hereinbefore.

*Example 37.*—3 grams of 1-amino-2-carbomethoxy-4-bromoanthraquinone, 1.5 grams of potassium acetate, 0.2 gram of copper acetate and 50 ccs. of 3,3,3-trifluoro-2-methyl-2-hydroxyanthraquinone are warmed together on a steam bath until no further color change toward the blue takes place. The reaction mixture thus obtained is poured into dilute hydrochloric acid and the 1-amino-2 - carbomethoxy - 4 - $\beta$ - hydroxy - $\beta$ - methyl - $\gamma$ - trifluoropropylaminoanthraquinone which forms is recovered by filtration, crystallized from ethyl alcohol and dried. It colors cellulose acetate textile materials reddish-blue shades.

By the use of an equivalent weight of 3,3-difluoro-2-hydroxypropylamine in place of 3,3,3-trifluoro-2-methyl-2-hydroxypropylamine in the above example, 1-amino-2-carbomethoxy - 4 - $\beta$ - hydroxy - $\gamma$ - difluoropropylaminoanthraquinone which colors cellulose acetate textile materials reddish-blue shades is obtained.

*Example 38.*—3 grams of 1-$\beta$-hydroxy-$\beta$-methyl-$\gamma$-trifluoropropylamino - 2 - carbomethoxy - 4 - bromoanthraquinone, 50 ccs. of ethylamine, 1.5 grams of potassium acetate and 0.2 gram of copper acetate are heated in a stirring autoclave at about 75° C. for 6 hours. The reaction mixture is poured into dilute hydrochloric acid and the 1-$\beta$-hydroxy-$\beta$-methyl-$\gamma$-trifluoropropylamino-2-carbomethoxy - 4 - ethylaminoanthraquinone which separates is recovered on the filter by filtration of the reaction mixture. It is purified by crystallization from n-butyl alcohol and dried. It colors cellulose acetate textile materials blue shades.

By the use of an equivalent amount of $\beta$-cyanoethylamine in place of ethylamine in the above reaction, 1-$\beta$ - hydroxy - $\beta$ - methyl - $\gamma$ - trifluoropropylamino - 2 - carbomethoxy-4-$\beta$-cyanoethylaminoanthraquinone is obtained. It colors cellulose acetate textile materials blue shades.

*Example 39.*—4 grams of 1-$\beta$-hydroxy-$\beta$-methyl-$\gamma$-trifluoropropylamino - 2 - carbomethoxy - 4 - bromoanthraquinone, 1.5 grams of potassium acetate, 0.2 gram of copper acetate and 30 ccs. of freshly distilled aniline are heated together at 100° C. until a bright bluish-green color is produced which does not increase in intensity on further heating. Then the reaction mixture is poured into dilute hydrochloric acid and the 1-$\beta$-hydroxy - $\beta$ - methyl - $\gamma$ - trifluoropropylamino - 2 - carbomethoxy - 4 - phenylaminoanthraquinone which precipitates is recovered by filtration, washed with water and dried. It is purified by crystallization from n-butyl alcohol. It colors cellulose acetate textile materials bluish-green shades.

Following the procedures more particularly described in Examples 16 to 39, inclusive, the following compounds 1 - $\beta$ - hydroxy - $\beta$ - methyl - $\gamma$ - difluoropropylamino - 2-cyano-4-$\beta$-methoxyethylaminoanthraquinone, 1-$\beta$-hydroxy - $\gamma$ - trifluoropropylamino - 2 cyano - 4 - $\beta$ - cyanoethylaminoanthraquinone, 1-$\beta$-hydroxy-$\beta$-methyl-$\gamma$-difluoropropylamino-2-carboxyanthraquinone, 1-$\beta$-hydroxy-$\gamma$-trifluoropropylamino - 2 - carboxy - 4 - bromoanthraquinone, 1-$\beta$-hydroxy-$\gamma$-difluoropropylamino-2-carboxy-4-$\beta$-hydroxyethylaminoanthraquinone, 1-$\beta$-hydroxy-$\beta$-methyl - $\gamma$ - trifluoropropylamino - 2 - carboxy - 4 - hydroxyanthraquinone, 1-amino-2-carboxy-4-$\beta$-hydroxy-$\beta$-methyl-$\gamma$-trifluoropropylaminoanthraquinone, 1-amino-2-carboxy - 4 - $\beta$ - hydroxy - $\beta$ - methyl - $\gamma$ - difluoropropylaminoanthraquinone, 1-$\beta$-hydroxyethylamino-2-carboxy-4 - $\beta$ - hydroxy - $\beta$ - methyl - $\gamma$ - trifluoropropylaminoanthraquinone, 1-$\beta$-hydroxyethylamino-2-carboxy-4-$\beta$-hydroxy - $\beta$- methyl - $\gamma$ - difluoropropylaminoanthraquinone, 1-$\beta$-hydroxy-$\gamma$-difluoropropylamino-2-carboxy-4-o-($\beta$-hydroxy-$\beta$-ethoxy-$\beta$-ethoxyethoxy) phenylaminoanthraquinone, 1-$\beta$-hydroxy - $\beta$ - methyl - $\gamma$ - trifluoropropylamino - 2 - carboethoxyanthraquinone, 1 - amino - 2 - carboethoxy - 4 - $\beta$ - hydroxy - $\gamma$ - trifluoropropylaminoanthraquinone, 1-$\beta$-hydroxy-$\gamma$-trifluoropropylamino-2-carbo - n - butoxy - 4 - $\beta$,$\gamma$ - dihydroxypropylaminoanthraquinone, 1-$\beta$-hydroxy-$\beta$-methyl-$\gamma$-trifluoropropylamino-2 - carbomethoxy - 4 - p - ($\beta$ - hydroxy - $\beta$ - ethoxy - $\beta$ - ethoxyethoxy) phenylaminoanthraquinone, 1-$\beta$-hydroxy-$\gamma$ - trifluoropropylamino - 2 carbomethoxy - 4 - p - ($\beta$ - hydroxy-$\beta$-ethoxy-$\beta$-ethoxyethoxy) phenylaminoanthraquinone, 1 - $\beta$ - hydroxy - $\gamma$ - difluoropropylamino - 2 -carbomethoxy - 4 - o - ($\beta$ - hydroxy -$\beta$ - ethoxy - $\beta$ - ethoxyethoxy) phenylaminoanthraquinone, 1-$\beta$-hydroxy-$\delta$-trifluorobutylamino-2-carbomethoxyanthraquinone, 1-$\beta$-hydroxy - $\delta$ - difluorobutylamino - 2 - carbomethoxyanthraquinone, 1-$\beta$-hydroxy-$\gamma$-trifluoropropylamino-2-carbomethoxy - 4 - p - ($\beta$ - hydroxy - $\beta$ - ethoxyethoxy) phenylaminoanthraquinone, 1-$\beta$-hydroxy-$\gamma$-difluoropropylamino - 2 - carbomethoxy - 4 - p - ($\beta$ - ethoxy - $\beta$ - ethoxy-$\beta$-ethoxyethoxy) phenylaminoanthraquinone and 1 - $\beta$ - hydroxy - $\gamma$ - trifluoropropylamino - 2 - carbomethoxy-4-p-($\beta$-methoxy-$\beta$-ethoxyethoxy) phenylaminoanthraquinone are readily prepared.

Certain of the intermediates, such as the polyfluorohydroxyalkylamines, used in the preparation of the new anthraquinone compounds of our invention are new compounds. These new intermediate compounds are fully described in our copending application Serial No. 211,177 which issued January 25, 1955, as U. S. Patent 2,700,686.

The new anthraquinone compounds described herein may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

The present application is a division of our U. S. application Serial No. 211,177, filed February 15, 1951, now U. S. Patent 2,700,686.

We claim:

1. The anthraquinone compounds having the formula:

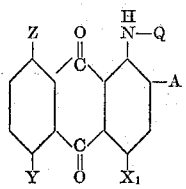

wherein Q represents a member selected from the group consisting of a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group and a 4,4-difluoro-2-hydroxybutyl group, $X_1$ represents a member selected from the group consisting of a hydrogen atom, a hydroxy group, a bromine atom, a β-hydroxyethylamino group, a β-hydroxypropylamino group, a γ-hydroxypropylamino group, a β,γ-dihydroxypropylamino group, a δ-hydroxybutylamino group, a monoalkylamino group having one to four, inclusive, carbon atoms, a monoalkoxyalkylamino group having three to four, inclusive, carbon atoms, a 2,2-difluoroethylamino group, a 2,2-difluoro-n-propylamino group, a 3,3-difluoropropylamino group, a 2,2,2-trifluoroethylamino group, a 3,3,3-trifluoropropylamino group, a 3,3,3-trifluoro-2-hydroxypropylamino group, a 3,3-difluoro-2-hydroxypropylamino group, a 3,3,3-trifluoro-2-methyl-2-hydroxypropylamino group, a 3,3-difluoro-2-methyl-2-hydroxypropylamino group, a 4,4,4-trifluoro-2-hydroxybutylamino group, a 4,4-difluoro-2-hydroxybutylamino group, a phenylamino group, a β-hydroxy-β-ethoxy-β-ethoxyphenylamino group, a β-methoxy-β-ethoxy-β-ethoxyphenylamino group, a β-ethoxy-β-ethoxy-β-ethoxyphenylamino group, a β-hydroxy-β-ethoxy-β-ethoxy-β-ethoxyphenylamino group, a β-methoxy-β-ethoxy-β-ethoxy-β-ethoxyphenylamino group and a β-ethoxy-β-ethoxy-β-ethoxy-β-ethoxyphenylamino group, A represents a member selected from the group consisting of a hydrogen atom and a bromine atom and Y and Z each represents a member selected from the group consisting of a hydrogen atom and a hydroxy group.

2. The anthraquinone compound having the formula:

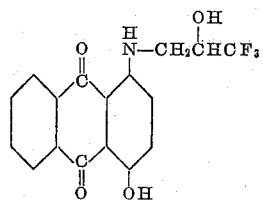

References Cited in the file of this patent
UNITED STATES PATENTS

| | | |
|---|---|---|
| 2,050,661 | Koeberle et al. | Aug. 11, 1936 |
| 2,466,008 | Dickey | Apr. 5, 1949 |
| 2,474,780 | Degering et al. | June 28, 1949 |
| 2,487,045 | Dickey et al. | Nov. 8, 1949 |
| 2,537,976 | Dickey et al. | Jan. 16, 1951 |
| 2,615,013 | Dickey | Oct. 21, 1952 |

FOREIGN PATENTS

| | | |
|---|---|---|
| 540,597 | Great Britain | Oct. 23, 1940 |